Dec. 12, 1967     M. BURK ET AL     3,357,503
RAM GUIDING DEVICE
Filed Oct. 22, 1965
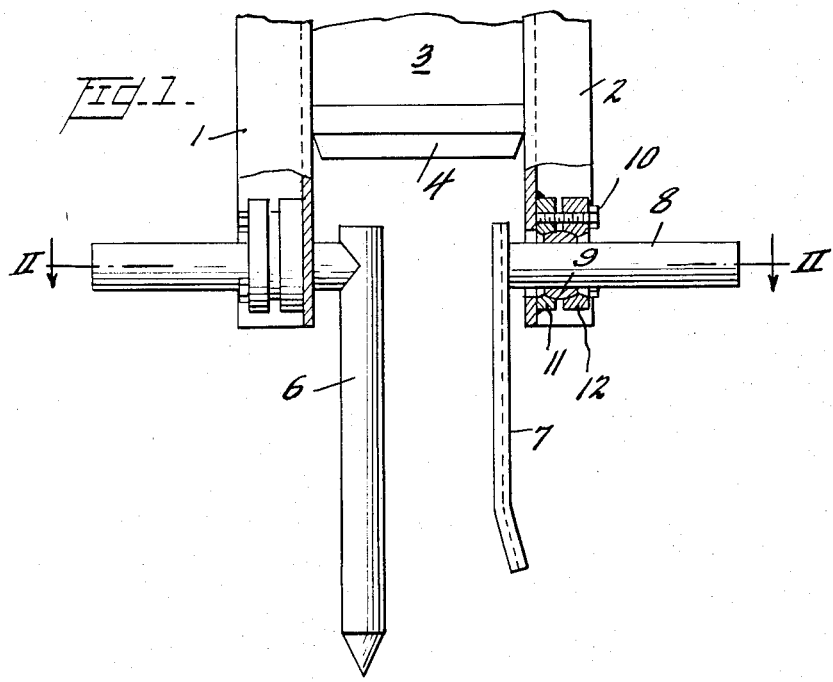
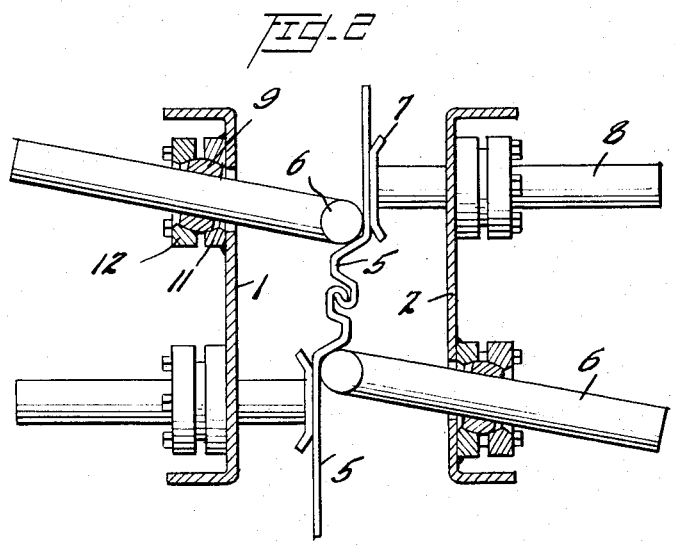
INVENTORS
Manfred Burk
Achim Kehrberger,
BY
ATTORNEYS 3,357,503
RAM GUIDING DEVICE
Manfred Burk, Bad Driburg, and Achim Kehrberger, Nellingen, Germany, assignors to Firma Delmag-Maschinenfabrik Reinhold Dornfeld, Esslingen (Neckar), Germany
Filed Oct. 22, 1965, Ser. No. 501,837
Claims priority, application Germany, Nov. 5, 1964, D 45,785
6 Claims. (Cl. 173—130)

ABSTRACT OF THE DISCLOSURE

A ram guiding device with two parallel guide rails spaced from each other for guiding a rammer and universally adjustable means for clamping the guide rails to an element to be rammed by the rammer, said means having a pair of pivot bearings, a plurality of holding members and locking means to lock the pivot bearings.

---

The present invention relates to improvements in a ram or pile driver and more particularly to a device for removably securing and adjusting two or more interconnected guide rails of the rammer in the proper position to the upper ends of the parts to be rammed, for example, of sheet piles, pipes, poles, or the like, so that the rammer will be movable along the guide rails in proper alignment with the parts to be rammed and will always hit the same in the proper position thereof.

A device of this kind which was known prior to this invention comprises a plurality of holding members in the form of pipes which extend parallel to each other and transverse to the direction of the guide rails to which they are adapted to be clamped. The ends of these holding members facing the lateral surfaces of a pile or pole to be clamped carry eccentric disks extending transverse to the axes of these pipes so that, by shifting the pipes in their axial direction and by turning them about their axes, it is possible to adjust the device to a certain extent in accordance with the outer shape of the pile and to clamp the guide rails in the proper position thereto. This device has the disadvantage that the adjustability and area of engagement of the eccentric disks upon the pile is very limited even if the device is designed so as to permit each holding member to be adjusted to different axially parallel positions. It is therefore often very difficult or even impossible to clamp the guide rails securely to parts to be rammed which have an irregular shape.

It is an object of the present invention to provide a ram guiding device, the holding members of which may be adjusted very easily and quickly in different directions and to very many different positions. This may be attained according to the invention by securing a pair of pivot bearings to the lower end of each of the guide rails along which the rammer is movable and to mount a holding member in each of these pivot bearings which is designed so as to permit the holding member to be adjusted to and locked in different angular positions as well as at different distances from the plane of the respective guide rail to which it is secured. Each of these pivot bearings comprises a slotted bearing ring which is provided with a spherical outer surface which is mounted between a pair of bearing plates. When these bearing plates, one of which is rigidly secured to the guide rail, are loosened from each other, the holding member may be shifted therein in its axial direction and also be turned about its axis, and it may further be pivoted in any desired direction. The holding members may therefore be very easily adjusted in accordance with the particular shape of any pile, post, or other part to be rammed so as to clamp the guide rails for the rammer in the proper position thereto. In addition, the parts of the holding members which are to be applied against the part to be rammed may be made of the most suitable shape for the particular purpose and one holding member may be easily and quickly exchanged for another.

According to one preferred embodiment of the invention, the pivot bearings for the holding members are all located within the same plane and each holding member consists of a rod which extends through and may be clamped by the bearing and of a holding part which extends at a right angle to the rod and is to be applied against the part to be rammed. This holding part may be made of different shapes and sizes and preferably of a considerable length in the ramming direction.

The features and advantages of the present invention will become further apparent from the following detailed description thereof which is to be read with reference to the accompanying diagrammatic drawings, in which—

FIGURE 1 shows, partly in section, a side view of the ram guiding device according to the invention which is secured to the lower ends of a pair of parallel guide rails for the rammer; while FIGURE 2 shows a partial cross section which is taken along the line II—II of FIGURE 1 and additionally illustrates the holding members of the device clamped upon two adjacent sheet piles.

For removably securing two or more interconnected parallel guide rails 1 and 2 along which a rammer 3 with an impact plate 4 thereon is slidable to the upper end of the part to be rammed, for example, one or two adjacent sheet piles 5, so that the rammer will be movable in accurate alignment with this part and hit the same in the proper position thereof, the device according to the invention comprises a pair of holding members 6 and 7 which are mounted on the lower end of each guide rail 1 and 2. The holding member 6 is rod-shaped and the holding member 7 is plate-shaped and one of them may be longer than the other. Each of these holding members is rigidly secured at right angles to a rod 8 which is axially slidable and universally pivotable within a pivot bearing which is secured to the lower end of the guide rail 1 or 2 and comprises a slotted bearing ring which has a spherical outer surface and is held between two bearing plates 11 and 12 which are spaced from each other and are connected to each other by three screws 10. For adjusting each rod 8 to different positions in its axial direction or for turning it about its axis and for pivoting it together with the respective holding member 6 or 7 to which it is secured to any desired angular position relative to the guide rails 1 and 2 and to the part 5 to be clamped, it is merely necessary to loosen one of the screws 10. After each holding member is properly adjusted so as to clamp the piles 5 at the most suitable part thereof in a position in which the guide rails 1 and 2 and the rammer 3 are properly centered and aligned relative to the piling 5, the formerly loosened screw 10 is again tightened and the holding member 6 or 7 is thereby securely locked in the adjusted position to the respective guide rail. The different holding members 6 and 7 may also be easily and quickly exchanged for each other or for holding members of different shapes. With holding members of a suitable shape it is also possible to clamp the guide rails 1 and 2 to piles, poles or the like which do not extend exactly parallel to the plane of the guide rails but at a slight angle thereto which does not affect a proper ramming operation.

Although our invention has been illustrated and described with reference to the preferred embodiments thereof we wish to have it understood that it is in no way limited to the details of such embodiments but is capable of numerous modifications within the scope of the appended claims.

Having thus fully disclosed our invention, what we claim is:

1. A ram guiding device comprising at least two parallel guide rails spaced from each other for guiding a rammer, and universally adjustable means for clamping said guide rails to an element to be rammed by said rammer, said means comprising a pair of pivot bearings secured to the lower end of each guide rail, a plurality of holding members each having a rod-shaped part inserted into one of said bearings and slidable in its axial direction therein and adapted to be turned about its axis and to be pivoted in different directions relative to the plane of said guide rails, and locking means for locking said pivot bearings and said holding members thereon in any adjusted position so as to clamp the element to be rammed between them.

2. A ram guiding device as defined in claim 1, in which each of said pivot bearings comprises a slotted bearing ring having a bore adapted to receive said rod-shaped part of one of said holding members and having a spherical outer surface, and a pair of members substantially enclosing said bearing ring, one of said members being rigidly secured to one of said guide rails, said locking means being adapted to clamp said pair of members together and thereby to lock said rod-shaped part rigidly in any adjusted position thereof.

3. A ram guiding device as defined in claim 1, in which said pivot bearings are mounted on said guide rails within the same plane, each of said holding members comprising said rod-shaped part and a holding part extending at a right angle to said rod-shaped part and adapted to be applied against one side of the element to be rammed so that said element may be clamped at opposite sides between at least two pairs of said holding members extending at any desired angle to each other and to said element.

4. A ram guiding device as defined in claim 3, in which said holding part comprises a plate secured near one end thereof at a right angle to one end of said rod-shaped part, the opposite end of said plate being spaced from said rod-shaped part and being slightly bent in the direction toward said rod-shaped part.

5. A ram guiding device as defined in claim 3, in which said holding part comprises a rod secured near one end at a right angle to one end of said rod-shaped part.

6. A ram guiding device as defined in claim 3, in which each of said guide rails carries two of said holding members of different shapes laterally and spaced from each other and having parallel axes when adjusted to their central positions.

References Cited

UNITED STATES PATENTS

| | | | |
|---|---|---|---|
| 1,875,825 | 9/1932 | Schroeder et al. | 173—130 |
| 2,012,828 | 8/1935 | Peterson | 173—130 |
| 3,243,190 | 3/1966 | Peregrine | 173—130 X |

FRED C. MATTERN, JR., *Primary Examiner.*

L. P. KESSLER, *Assistant Examiner.*